United States Patent
Chang

(10) Patent No.: US 7,916,488 B2
(45) Date of Patent: Mar. 29, 2011

(54) CHIP CARD HOLDING MODULE AND ELECTRONIC DEVICE USING THE SAME

(75) Inventor: Ming-Shiung Chang, Taipei County (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 350 days.

(21) Appl. No.: 12/180,614

(22) Filed: Jul. 28, 2008

(65) Prior Publication Data

US 2009/0303689 A1    Dec. 10, 2009

(30) Foreign Application Priority Data

Jun. 4, 2008  (CN) .......................... 2008 1 0301965

(51) Int. Cl.
*H01R 13/00*  (2006.01)
(52) U.S. Cl. ........................................ 361/737; 439/945
(58) Field of Classification Search .................. 361/737; 439/630, 945, 946
See application file for complete search history.

(56) References Cited

U.S. PATENT DOCUMENTS

| | | | | |
|---|---|---|---|---|
| 6,095,868 A | * | 8/2000 | Hyland et al. | 439/630 |
| 6,175,505 B1 | * | 1/2001 | Cheng et al. | 361/752 |
| 6,273,739 B1 | * | 8/2001 | Konno et al. | 439/331 |
| 6,623,304 B2 | * | 9/2003 | Harasawa et al. | 439/630 |
| 6,971,919 B1 | * | 12/2005 | Huang | 439/630 |
| 7,264,495 B2 | * | 9/2007 | Zuo et al. | 439/326 |
| 7,438,600 B1 | * | 10/2008 | Hung et al. | 439/630 |
| 7,670,185 B2 | * | 3/2010 | Zhang et al. | 439/630 |

* cited by examiner

*Primary Examiner* — Dameon E Levi
(74) *Attorney, Agent, or Firm* — Steven M. Reiss

(57) ABSTRACT

A chip card holding module (24) having a connector portion (26) and a securing member (28) is described. The connector portion includes a base (261) defining two latching slots (263) on two lateral sides and a plurality of terminals (30) arranged on two opposite ends (261c, 261d) of the base. The securing member comprising a resisting plate (281) and a pair of connecting plates (282) respectively extends from two ends of the resisting plate, the connecting plates being inserted into the latching slots so as to define a space for receiving a chip card.

10 Claims, 5 Drawing Sheets

CHIP CARD HOLDING MODULE AND ELECTRONIC DEVICE USING THE SAME

BACKGROUND

1. Field of the Invention

The present invention relates to a chip card holding module, and particularly to an electronic device equipped with the chip card holding module.

2. Discussion of the Related Art

With the rapid development of communications, the use of mobile phones, personal digital assistants (PDA), and other portable electronic devices are becoming increasingly popular. Consequently, various functions of the portable electronic devices, such as storing personal information in chip cards, are also increasingly in high demand. Therefore, there are a variety of chip cards, such as secure digital memory cards (SD cards), compact flash cards (CF cards), subscriber identification module cards (SIM cards), that can be equipped within portable electronic devices.

FIG. 5 shows a typical mobile phone 100 having a housing 10, a circuit board 16, a chip card holding module 14 arranged on the circuit board 16, and a SIM card 20. The chip card holding module 14 includes a base 122, a plurality of contacts 124 arranged on the base 122, a frame 126, a securing member 128 and an inlet 130 for installing the SIM card 20. The dimension of the frame 126 equals to the dimension of the SIM card 20. The securing member 128 is arranged on the frame 126 and is adjacent to the base 122. In assembly, the SIM card 20 is inserted from the inlet 130 into the chip card holding module 14 until the SIM card 20 is completely received in the chip card holding module 14 to electrically connect the SIM card 20 to the contacts 124.

However, when more and more electronic components have to be installed on the mobile phone 100, the frame 126 and the securing member 128 of the chip card holding module 12 take up a good amount of space on the circuit board 16. As a consequence, limits the available space for arranging electronic components on the circuit board 16.

Therefore, a new chip card holding module for saving space on the circuit board and an electronic device equipped with the chip card holding module are desired in order to overcome the above-described problems.

BRIEF DESCRIPTION OF THE DRAWINGS

Many aspects of the chip card holding module can be better understood with reference to the following drawings. The components in the drawings are not necessarily to scale, the emphasis instead being placed upon clearly illustrating the principles of the present chip card holding module. Moreover, in the drawings, like reference numerals designate corresponding parts throughout the several views.

DETAILED DESCRIPTION OF THE EMBODIMENTS

Figure 1:
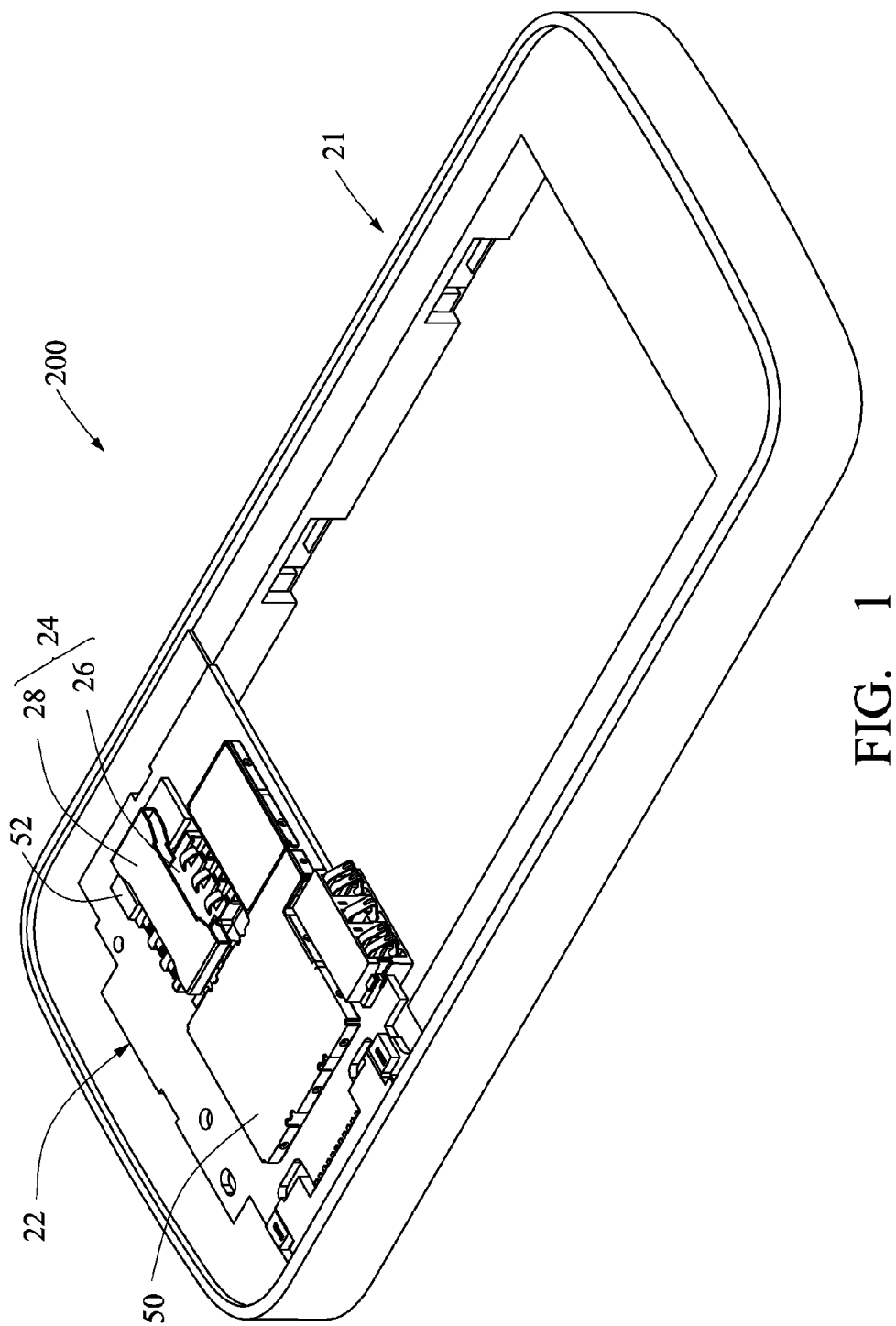
FIG. 1 is an isometric view of the portable electronic device equipped with the present chip card holding module according to an exemplary embodiment.

Referring to the drawings in detail, FIG. 1 shows a portable electronic device 200 including a housing 21, a circuit board 22 arranged within the housing 21, and a chip card holding module 24. A plurality of electronic components 50, 52 are arranged on a top surface of the circuit board 22. The chip card holding module 24 may be fixed on the circuit board 22 by the surface mount technology (SMT). The chip card holding module 24 includes a connector portion 26 and a securing member 28.

Figure 2:
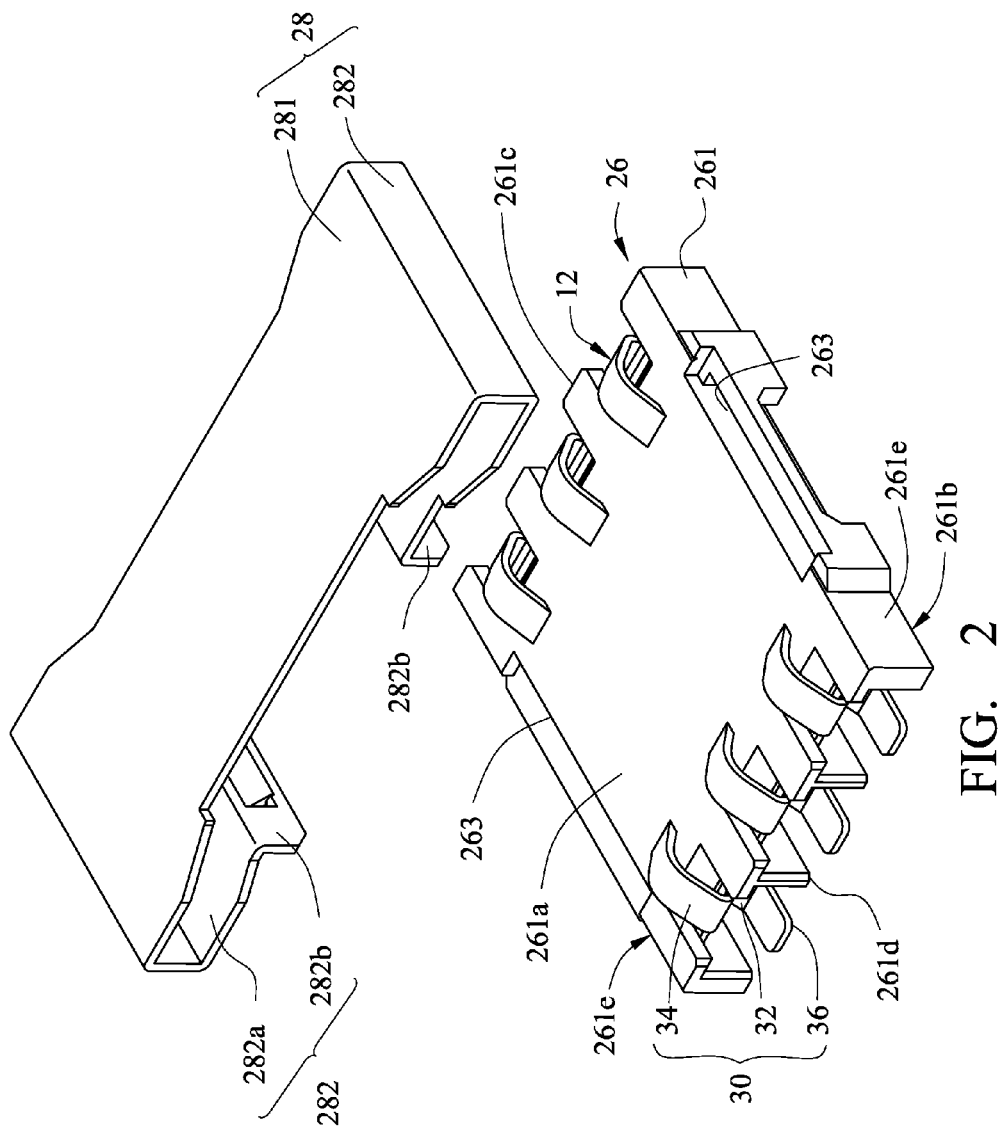
FIG. 2 is an exploded isometric view of the present chip card holding module according to an exemplary embodiment.

Referring also to FIG. 2, the connector portion 26 includes a base 261 and a plurality of terminals 30. The base 261 is substantially rectangular, and includes a top surface 261a, a bottom surface 261b opposite to the top surface 261a, a first end 261c and a second end 261d opposite to the first end 261c, and two lateral sides 261e. The base 261 defines a plurality of terminal slots 12 at both the first and second ends 261c, 261d for receiving the terminals 30, and respectively defines a latching slot 263 on each of two lateral sides of the base 261.

The terminals 30 are made by punching and bending metallic sheets. Each of the terminals 30 has a fixing portion 32, a contact portion 34 and a welding portion 36. The fixing portion 32 is fixed on the terminal slots 12 of the base 261. The contact portion 34 extends from the fixing portion 32 toward the top surface 261a. Thus, the contact portion 34 protrudes from the top surface 261a of the base 261 and contacts with the chip card (not shown) arranged on the base 261 to electrically connect the chip card. The welding portion 36 extends from the fixing portion 32 and towards a direction parallel to the bottom surface 261b. Thus, the welding portion 36 protrudes from the bottom surface of the base 261 and is welded on the circuit board 22 (refer to FIG. 4) so as to electrically connect the circuit board 22.

The securing member 28 includes a resisting plate 281 and a pair of connecting plates 282 respectively extends from two ends of the resisting plate 281. Each of the connecting plate 282 includes a bending portion 282a and an installing portion 282b. Each of the bending portions 282a vertically extends from two opposite ends of the corresponding resisting plate 281 and then is vertically bent and faces each other. The installing portions 282b vertically extend from ends of the bending portions 282a toward a direction oriented away from the resisting plate 281. It is to be noted that the height of the installing portions 282b substantially equal to the depth of the latching slots 263 of the connector portion 26. Additionally, securing member 28 is wider than connector portion 28.

Figure 3:
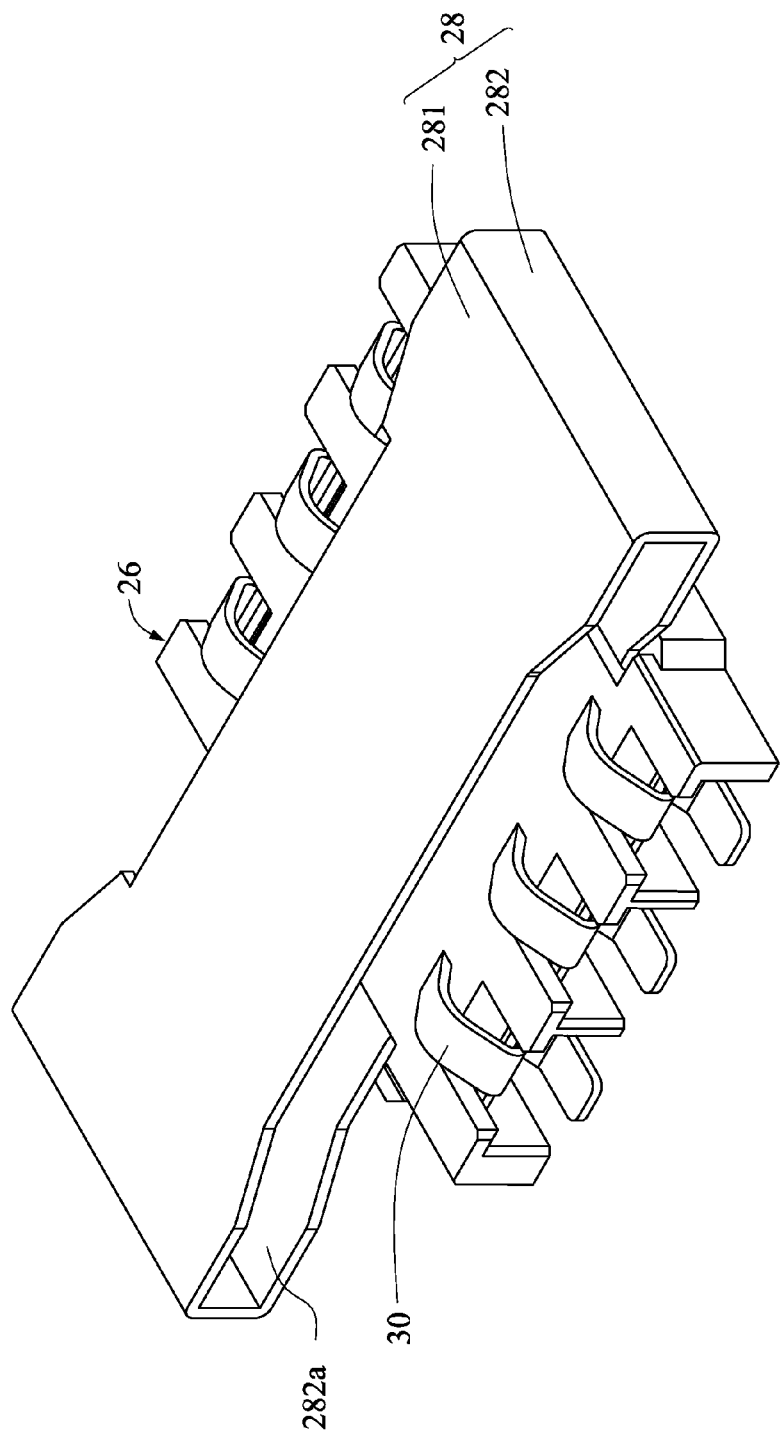
FIG. 3 is an assembled isometric view of the chip card holding module of FIG. 3.

FIG. 3 shows an assembled chip card holding module 24 without a chip card installed therein. In assembly, the connector portion 26 is firstly fixed on the circuit board 22. The installing portions 282b of the securing member 28 are inserted into the latching slots 263 of the connector portion 26 so as to define a space for receiving the chip card.

Figure 4:
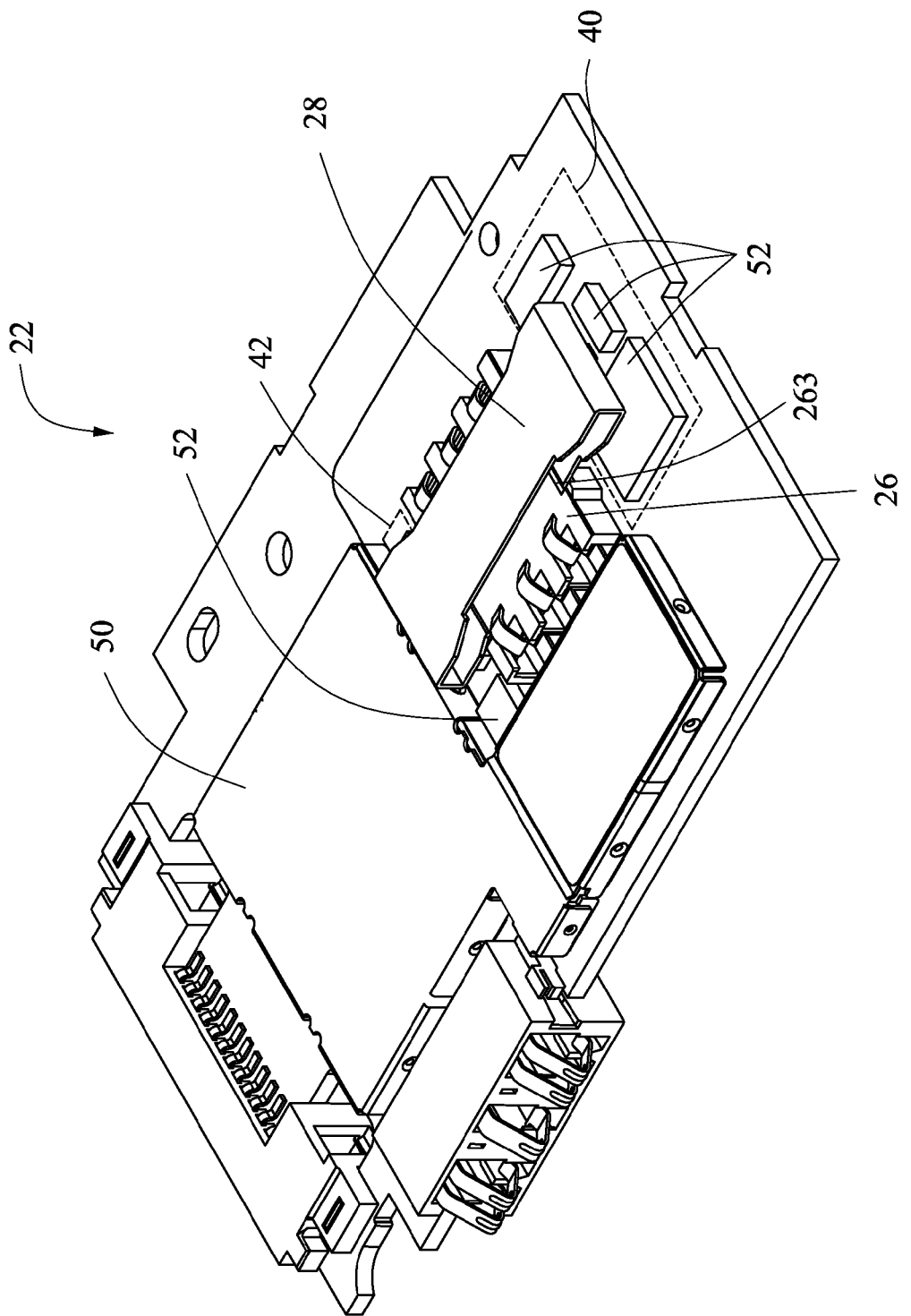
FIG. 4 is an isometric view of the present chip card holding module arranged on a circuit board.
Figure 5:
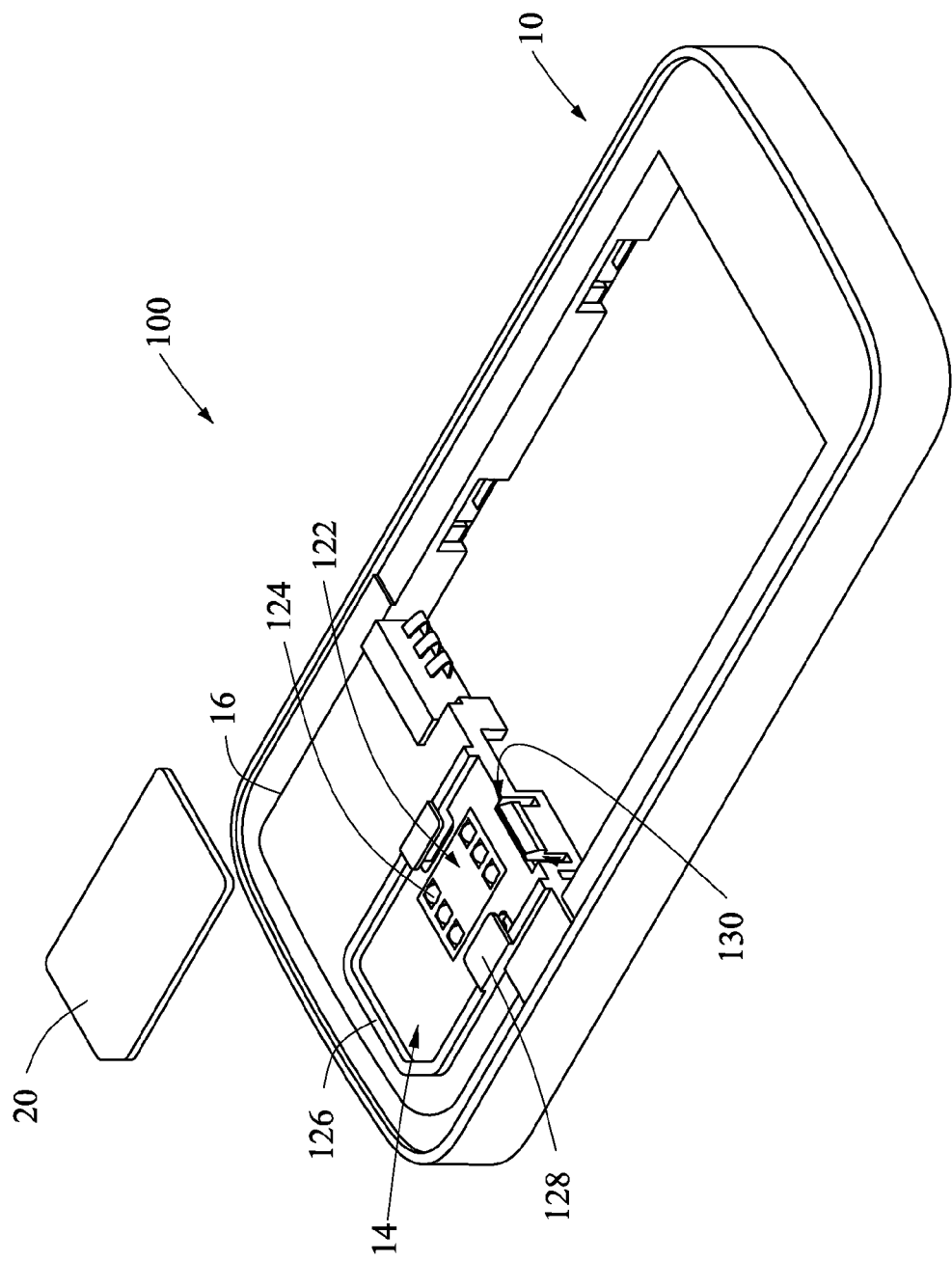
FIG. 5 is an isometric view of a portable electronic device equipped with a typical chip card holding module.

From the foregoing it will be seen that the chip card holding module 24 is arranged on the circuit board 22 without a frame for receiving the chip card. As shown in FIG. 4, the connector portion 26 of the chip card holding module 24 occupies a small portion of the space of the circuit board 22 and securing member 28 is positioned above, and spaced from, the upper surface of the circuit board 22. Containment spaces 40, 42 are defined under the portions of the securing member 28 that extend further than the width of connector portion 26. Thus, chip holding module 24 has a T-like shape. Containment spaces 40, 42 can be utilized to arrange electronic components 52 thereon, thus increase the number of electronic components that can be arranged on the circuit board 22 compared to when securing member 28 is positioned close to, or on, the circuit board 22.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A chip card holding module comprising:
   a connector portion comprising a base defining two latching slots on two lateral sides and a plurality of terminals arranged on two opposite ends of the base; and
   a securing member, the securing member wider than the connector portion and comprising a resisting plate and a pair of connecting plates respectively extends from two ends of the resisting plate and beyond the lateral sides of the connector portion, each of the connecting plates comprising a bending portion and installing portions, the bending portions of the connecting plates being "L"-shaped, vertically extending from two opposite ends of the resisting plate and vertically bending toward each other, the installing portions of the connecting plates vertically extending from ends of the bending portions toward a direction oriented away from the resisting plate; the installing portions of the connecting plates being inserted into the latching slots so as to define a space for receiving a chip card, such that containment areas are formed under portions of the securing member.

2. The chip card holding module as claimed in claim 1, wherein the base comprises a top surface, each of the terminals comprises a fixing portion and a contact portion extending from the fixing portion toward the top surface for electrically connecting the chip card arranged on the top surface.

3. The chip card holding module as claimed in claim 2, wherein the base comprises a bottom surface opposite to the top surface, each of the terminals comprises a welding portion extending from the fixing portion and towards a direction parallel to the bottom surface.

4. The chip card holding module as claimed in claim 1, wherein the base defines a plurality of terminal slots on the two opposite ends of the base for receiving the terminals.

5. The chip card holding module as claimed in claim 1, the height of the installing portion equals to the depth of the latching slot.

6. An electronic device comprising:
   a housing;
   a circuit board arranged within the housing and having an upper surface; and
   a chip card holding module, the chip card holding module comprising:
   a connector portion comprising a base defining two latching slots on two lateral sides and a plurality of terminals arranged on two opposite ends of the base;
   a securing member, the securing member wider than the connector portion and positioned above, and spaced from, the upper surface of the circuit board, the securing member comprising a resisting plate and a pair of connecting plates respectively extends from two ends of the resisting plate and beyond the lateral sides of the connector portion, each of the connecting plates comprising a bending portion and installing portions, the bending portions of the connecting plates being "L"-shaped, vertically extending from two opposite ends of the resisting plate and vertically bending toward each other, the installing portions of the connecting plates vertically extending from ends of the bending portions toward a direction oriented away from the resisting plate; the installing portions of the connecting plates being inserted into the latching slots so as to define a space for receiving a chip card.

7. The electronic device as claimed in claim 6, wherein the base comprises a top surface, each of the terminals comprises a fixing portion and a contact portion extending from the fixing portion toward the top surface for electrically connecting the chip card arranged on the top surface.

8. The electronic device as claimed in claim 7, wherein the base comprises a bottom surface opposite to the top surface, each of the terminals comprises a welding portion extending from the fixing portion and towards a direction parallel to the bottom surface.

9. The electronic device as claimed in claim 6, wherein the base defines a plurality of terminal slots on the two opposite ends of the base for receiving the terminals.

10. The electronic device as claimed in claim 6, the height of the installing portion equals to the depth of the latching slot.

* * * * *